US008464751B2

(12) United States Patent
Su et al.

(10) Patent No.: US 8,464,751 B2
(45) Date of Patent: Jun. 18, 2013

(54) OXYGEN CONTENT ADJUSTMENT APPARATUS AND CONTAINER DATA CENTER INCLUDING THE SAME

(75) Inventors: Tsung-Han Su, Taipei Hsien (TW); Chun-Ming Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 378 days.

(21) Appl. No.: 12/886,523

(22) Filed: Sep. 20, 2010

(65) Prior Publication Data

US 2012/0035772 A1 Feb. 9, 2012

(30) Foreign Application Priority Data

Aug. 9, 2010 (TW) ............................... 99126540 A

(51) Int. Cl.
*F16K 31/02* (2006.01)

(52) U.S. Cl.
USPC ........................................ 137/487.5; 137/607

(58) Field of Classification Search
USPC ............... 137/487.5, 606, 607; 422/111, 113, 422/114
See application file for complete search history.

(56) References Cited

U.S. PATENT DOCUMENTS

| | | | | |
|---|---|---|---|---|
| 6,112,822 | A * | 9/2000 | Robin et al. | 169/46 |
| 6,119,715 | A * | 9/2000 | Russell | 137/240 |
| 6,314,754 | B1 * | 11/2001 | Kotliar | 62/640 |
| 6,668,850 | B2 * | 12/2003 | Kim | 137/93 |

* cited by examiner

*Primary Examiner* — William McCalister
*Assistant Examiner* — Daniel Edelbrock
(74) *Attorney, Agent, or Firm* — Altis Law Group, Inc.

(57) ABSTRACT

An oxygen content adjustment apparatus includes an oxygen content detector, a number of keys, a controller, an oxygen source, a first nozzle, a first valve, a flame retardant gas source, a second nozzle, and a second valve. The controller is connected to the oxygen content detector and the keys. A first terminal of the first valve is connected to the controller. A second terminal of the first valve is connected to the oxygen source. A third terminal of the first valve is connected to the first nozzle. A first terminal of the second valve is connected to the controller. A second terminal of the second valve is connected to the flame retardant gas source. A third terminal of the second valve is connected to the second nozzle.

12 Claims, 1 Drawing Sheet

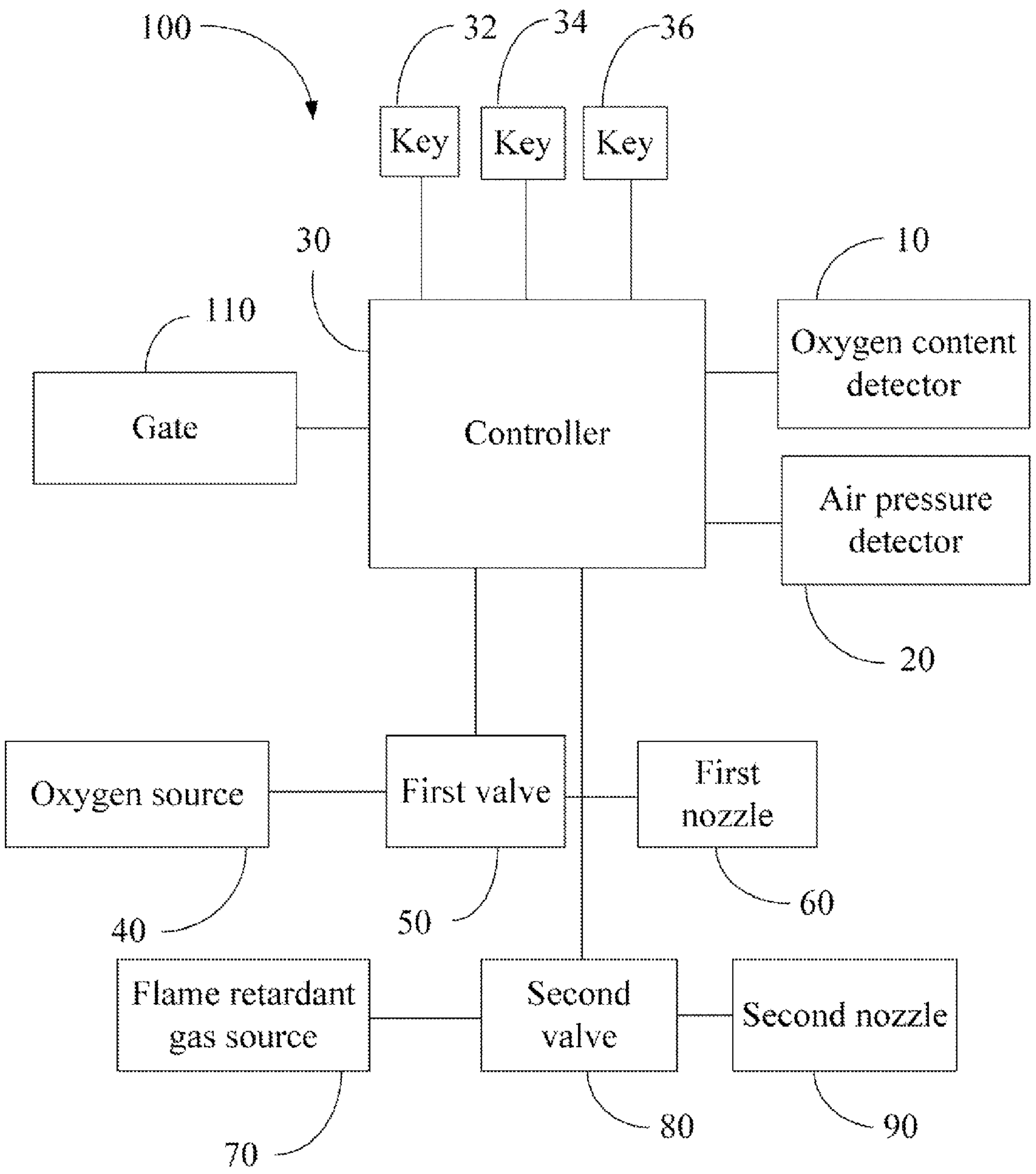
100
32
34
36
Key
Key
Key
30
10
110
Oxygen content detector
Gate
Controller
Air pressure detector
20
Oxygen source
First valve
First nozzle
40
50
60
Flame retardant gas source
Second valve
Second nozzle
70
80
90

OXYGEN CONTENT ADJUSTMENT APPARATUS AND CONTAINER DATA CENTER INCLUDING THE SAME

BACKGROUND

1. Technical Field

The present disclosure relates to an oxygen content adjustment apparatus and a container data center including the oxygen content adjustment apparatus.

2. Description of Related Art

For most humans, a comfortable range for oxygen content of breathable air is about 17%-21% range. Discomfort occurs when the oxygen content is between 14%-17%, this discomfort becomes a physical hazard when the oxygen content is lower than 14%. To make an enclosed space such as a container data center habitable, the oxygen content therein is controlled to be between 17%-21% of the ambient air. However, when the enclosed space is unoccupied, it is needless to have the oxygen content at the higher percentage and importantly the higher oxygen content of the ambient air will sustain a fire. Therefore, there is room for improvement in the art.

BRIEF SUMMARY OF THE INVENTION

An embodiment of an oxygen content adjustment apparatus includes an oxygen content detector, a plurality of keys, a controller, an oxygen source, a first nozzle, a first valve, a flame retardant gas source, a second nozzle, and a second valve. The oxygen content detector detects oxygen content in a container data center and issuing a first detection result. The keys regulate oxygen content in environment inside the container data center. The controller is electrically connected to the oxygen content detector and the keys. The oxygen source stores oxygen. The first valve is connected between the oxygen source and the first nozzle. The first valve includes a control terminal electrically connected to the controller for controlling open or closing of the first valve. The flame retardant gas source stores flame retardant gas. The second valve includes a control terminal connected to the controller. The second valve is further connected to the flame retardant as source and the second nozzle.

Other advantages and novel features will become more apparent from the following detailed description when taken in conjunction with the accompanying drawings, in which:

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout.

The FIGURE is a block diagram of an exemplary embodiment of an oxygen content adjustment apparatus.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

Referring to the FIGURE, an exemplary embodiment of an oxygen content adjustment apparatus 100 includes an oxygen content detector 10, an air pressure detector 20, a controller 30, three keys 32, 34, and 36, an oxygen source 40, a first valve 50, a first nozzle 60, a flame retardant gas source 70, a second valve 80, a second nozzle 90, and a gate 110. The oxygen content adjustment apparatus 100 is mounted in a container data center.

The oxygen content detector 10 detects the oxygen content in the environment, and issues a first detection result.

The controller 30 is electrically connected to the oxygen content detector 10, the air pressure detector 20, and the keys 32, 34, and 36. The controller 30 is also electrically connected to control terminals of the first valve 50 and the second valve 80, and electrically connected to a control terminal of the gate 110. The gate 110 equalizes the air pressure inside the container data center and the outside air pressure.

The first valve 50 is connected between the oxygen source 40 and the first nozzle 60. The controller 30 controls opening or closing of the first valve 50.

The second valve 80 is connected between the flame retardant gas source 708 and the second nozzle 90. The controller 30 controls opening or closing of the second valve 80.

The oxygen source 40 stores oxygen. The flame retardant gas source 70 stores flame-retardant gas, such as nitrogen, carbon dioxide, or heptafluoropropane.

When a person is in the container data center, the person presses the key 32, and the key 32 is activated. The oxygen content detector 10 detects the oxygen content in the environment and issues the first detection result to the controller 30, which determines whether the oxygen content is within a 17%-21% range. The controller 30 directs the first valve 50 to connect the oxygen source 40 to the first nozzle 60 if the oxygen content is below 17%. The oxygen of the oxygen source 40 flows into the environment. At the same time, the oxygen content detector 10 continually detects the oxygen content in the environment. The controller 30 directs the first valve 50 to disconnect the oxygen source 40 from the first nozzle 60 if the oxygen content exceeds 17%.

When the last person leaves the container data center, he or she presses the key 36, and the key 36 is activated. The oxygen content detector 10 monitors whether the oxygen content in the environment is below 14% and issues the first detection result to the controller 30. The controller 30 directs the second valve 80 to connect the flame retardant gas source 70 to the second nozzle 90 if the oxygen content exceeds 14%. The flame retardant gas of the flame retardant gas source 70 flows into the container data center. At the same time, the oxygen content detector 10 continually detects the oxygen content in the environment. The controller 30 directs the second valve 80 to disconnect the flame retardant gas source 70 from the second nozzle 90 if the oxygen content is less than 14%.

When the person will to be in the container data center for only a short time, he or she presses the key 34, and the key 34 is activated. The oxygen content detector 10 monitors whether the oxygen content in the container data center is within a 14%-17% range and issues the first detection result to the controller 30.

The controller 30 directs the second valve 80 to connect the flame retardant gas source 70 to the second nozzle 90 if the oxygen content exceeds 17%. The flame retardant gas of the flame retardant gas source 70 flows into the container data center. At the same time, the oxygen content detector 10 continually detects the oxygen content in the environment. The controller 30 directs the second valve 80 to disconnect the flame retardant gas source 70 from the second nozzle 90 if the oxygen content is less than 17%.

The controller 30 directs the first valve 50 to connect the oxygen source 40 to the first nozzle 60 if the oxygen content is less than 14%. The oxygen of the oxygen source 40 flows into the container data center. At the same time, the oxygen content detector 10 continually detects the oxygen content in the environment. The controller 30 directs the first valve 50 to disconnect the oxygen source 40 from the first nozzle 60 if the oxygen content exceeds 14%.

The air pressure detector 20 detects air pressure in the environment and issues a second detection result to the controller 30. The controller 30 directs the gate 110 to open if the air pressure in the environment exceeds a predetermined valve.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An oxygen content adjustment apparatus comprising:
- an oxygen content detector detecting oxygen content in a container data center and issuing a first detection result;
- a plurality of keys regulating oxygen content inside the container data center;
- a controller connected to the oxygen content detector and the plurality of keys;
- an oxygen source storing oxygen;
- a first nozzle set in the container data center;
- a first valve connected between the oxygen source and the first nozzle, and comprising a control terminal electrically connected to the controller for controlling opening or closing of the first valve;
- a flame retardant gas source storing flame retardant gas;
- a second nozzle set in the container data center; and
- a second valve connected between the oxygen source and the second nozzle, and comprising a control terminal electrically connected to the controller for controlling opening or closing of the second valve; wherein when the oxygen content in the container data center is less than a desired content corresponding to a pressed key, the controller controls the first valve to connect to the oxygen source and the first nozzle for making the oxygen stored in the oxygen source flow into the container data center, when the oxygen content in the container data center is greater than the desired content corresponding to the pressed key, the controller controls the second valve to connect the flame retardant gas source and the second nozzle for making the flame retardant gas stored in the flame retardant gas source flow into the container data center.

2. The oxygen content adjustment apparatus of claim 1, wherein the flame-retardant gas is nitrogen, carbon dioxide, or heptafluoropropane.

3. The oxygen content adjustment apparatus of claim 1, further comprising an air pressure detector and a gate, wherein the air pressure detector and a control terminal of the gate are connected to the controller, the air pressure detector detects air pressure in the environment and issues a second detection result to the controller, and the controller directs the gate to open if the air pressure in the environment exceeds a predetermined value.

4. The oxygen content adjustment apparatus of claim wherein the plurality of keys comprises a first key, which, when activated, drives the controller to direct the oxygen content in the environment to within a 17%-21% range.

5. The oxygen content adjustment apparatus of claim 1, wherein the plurality of keys comprises a second key, which, when activated, drives the controller to direct the oxygen content in the environment to within a 14%-17% range.

6. The oxygen content adjustment apparatus of claim 1, wherein the plurality of keys comprises a third key, which, when activated, drives the controller to direct the oxygen content in the environment to below 14%.

7. A container data center, comprising:
- an oxygen content adjustment apparatus comprising:
  - an oxygen content detector detecting oxygen content inside the container data center and issuing a first detection result;
  - a plurality of keys regulating oxygen content in the environment inside the container data center;
  - a controller connected to the oxygen content detector and the plurality of keys;
  - an oxygen source storing oxygen;
  - a first nozzle set in the container data center;
  - a first valve connected between the oxygen source and the first nozzle, and comprising a control terminal electrically connected to the controller for controlling opening or closing of the first valve;
  - a flame retardant gas source storing flame retardant gas;
  - a second nozzle set in the container data center; and
  - a second valve connected between the oxygen source and the second nozzle, and comprising a control terminal electrically connected to the controller for controlling opening or closing of the first valve; wherein when the oxygen content in the container data center is less than a desired content corresponding to a pressed key, the controller controls the first valve to connect the oxygen source and the first nozzle for making the oxygen stored in the oxygen source flow into the container data center, when the oxygen content in the container data center is greater than the desired content corresponding to the pressed key, the controller controls the second valve to connect the flame retardant gas source and the second nozzle for making the flame retardant gas stored in the flame retardant gas source flow into the container data center.

8. The container data center of claim 7, wherein the flame-retardant gas is nitrogen, carbon dioxide, or heptafluoropropane.

9. The container data center of claim 7, wherein the oxygen content adjustment apparatus further comprises an air pressure detector and a gate, wherein the air pressure detector and a control terminal of the gate are connected to the controller, and the air pressure detector detects air pressure in the environment and issues a second detection result to the controller, which opens the gate if the air pressure in the environment exceeds a predetermined value.

10. The container data center of claim 7, wherein the plurality of keys comprises a first key, which, when activated, drives the controller to direct the oxygen content in the environment to within a 17%-21% range.

11. The container data center of claim 7, wherein the plurality of keys comprises a second key, which, when activated, drives the controller to direct the oxygen content in the environment to within a 14%-17% range.

12. The container data center of claim 7, wherein the plurality of keys comprises a third key, which, when activated, drives the controller to direct the oxygen content in the environment to below 14%.

* * * * *